(12) United States Patent
Koehler

(10) Patent No.: US 9,976,656 B2
(45) Date of Patent: May 22, 2018

(54) CONTROL VALVE FOR A CAMSHAFT ADJUSTER

(71) Applicant: Schaeffler Technologies AG & Co. KG, Herzogenaurach (DE)

(72) Inventor: David Koehler, Egloffstein (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 136 days.

(21) Appl. No.: 15/111,126

(22) PCT Filed: Oct. 31, 2014

(86) PCT No.: PCT/DE2014/200611
§ 371 (c)(1),
(2) Date: Jul. 12, 2016

(87) PCT Pub. No.: WO2015/113533
PCT Pub. Date: Aug. 6, 2015

(65) Prior Publication Data
US 2016/0334022 A1 Nov. 17, 2016

(30) Foreign Application Priority Data
Jan. 29, 2014 (DE) .................. 10 2014 201 562

(51) Int. Cl.
*F01L 1/344* (2006.01)
*F16K 3/26* (2006.01)
(Continued)

(52) U.S. Cl.
CPC .............. *F16K 3/26* (2013.01); *F01L 1/3442* (2013.01); *F16K 15/02* (2013.01);
(Continued)

(58) Field of Classification Search
CPC ........ F16K 3/26; F16K 31/1221; F16K 15/02; F16K 11/716; F16K 11/0712;
(Continued)

(56) References Cited

U.S. PATENT DOCUMENTS

| 8,967,105 | B2 * | 3/2015 | Hoppe | ............... | F01L 1/344 |
| | | | | | 123/90.17 |
| 2004/0226526 | A1 * | 11/2004 | Palesch | ............... | F01L 1/022 |
| | | | | | 123/90.17 |

(Continued)

FOREIGN PATENT DOCUMENTS

DE 102012208809 A1 * 11/2013 ............ F01L 1/3442

*Primary Examiner* — Marina Tietjen
(74) *Attorney, Agent, or Firm* — Davidson, Davidson & Kappel, LLC

(57) ABSTRACT

A control valve for a camshaft adjuster is provided. The control valve contains a hollow cylindrical control piston, which has radially arranged piston openings on a piston head of the control piston, which piston head has a reduced diameter in comparison with the adjacent segment. Pressure medium flows along the outer cylindrical surface of the control piston, reaches into the piston openings, and causes a flow force that depends on the relative position of the control piston in the circumferential direction. For the purpose of weakening this dependence, the piston openings and sleeve openings are distributed over the circumference, wherein the angle between the axes of the piston openings differs from the angle between the axes of the sleeve openings and wherein the same angle range covered by the piston openings and sleeve openings at the same time, in dependence on the position of the control piston in relation to the control sleeve, remains approximately the same.

10 Claims, 5 Drawing Sheets

(51) Int. Cl.
*F16K 15/02* (2006.01)
*F16K 31/122* (2006.01)

(52) U.S. Cl.
CPC . *F16K 31/1221* (2013.01); *F01L 2001/34426* (2013.01); *F01L 2001/34433* (2013.01)

(58) Field of Classification Search
CPC .. F16K 27/048; F16K 31/0613; F16K 15/183; F01L 1/344; F01L 1/3442; F01L 5/14; F01L 2001/34423; F01L 2001/34433; F01L 2004/34426; F01L 2001/0475; F01L 2001/0476; F01L 2001/34453; Y10T 137/86775; Y10T 137/87169; Y10T 137/86702; Y10T 137/86574; Y10T 137/8671; Y10T 137/86622; Y10T 137/8663; Y10T 137/86694
See application file for complete search history.

(56) References Cited

U.S. PATENT DOCUMENTS

2009/0020178 A1* 1/2009 Stallmann ................ F01L 1/34
137/625.6
2010/0300388 A1* 12/2010 Lang ..................... F01L 1/3442
123/90.17

* cited by examiner

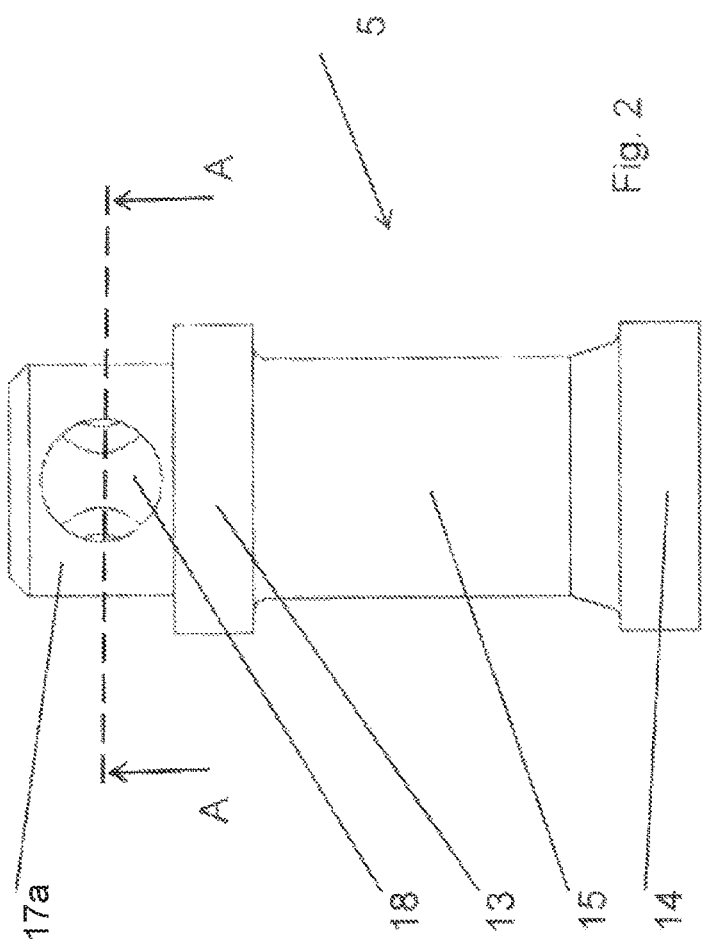

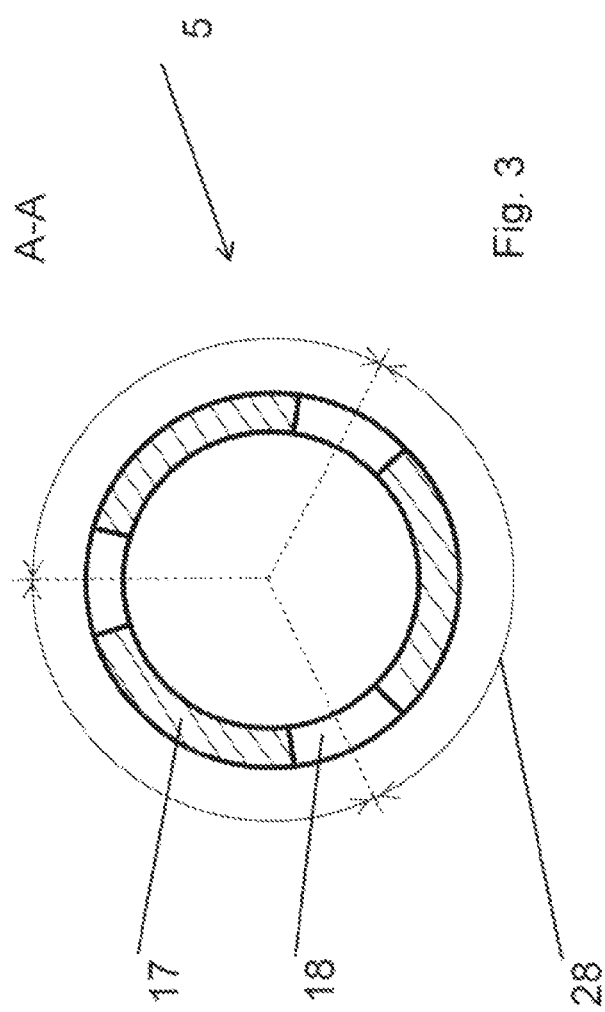

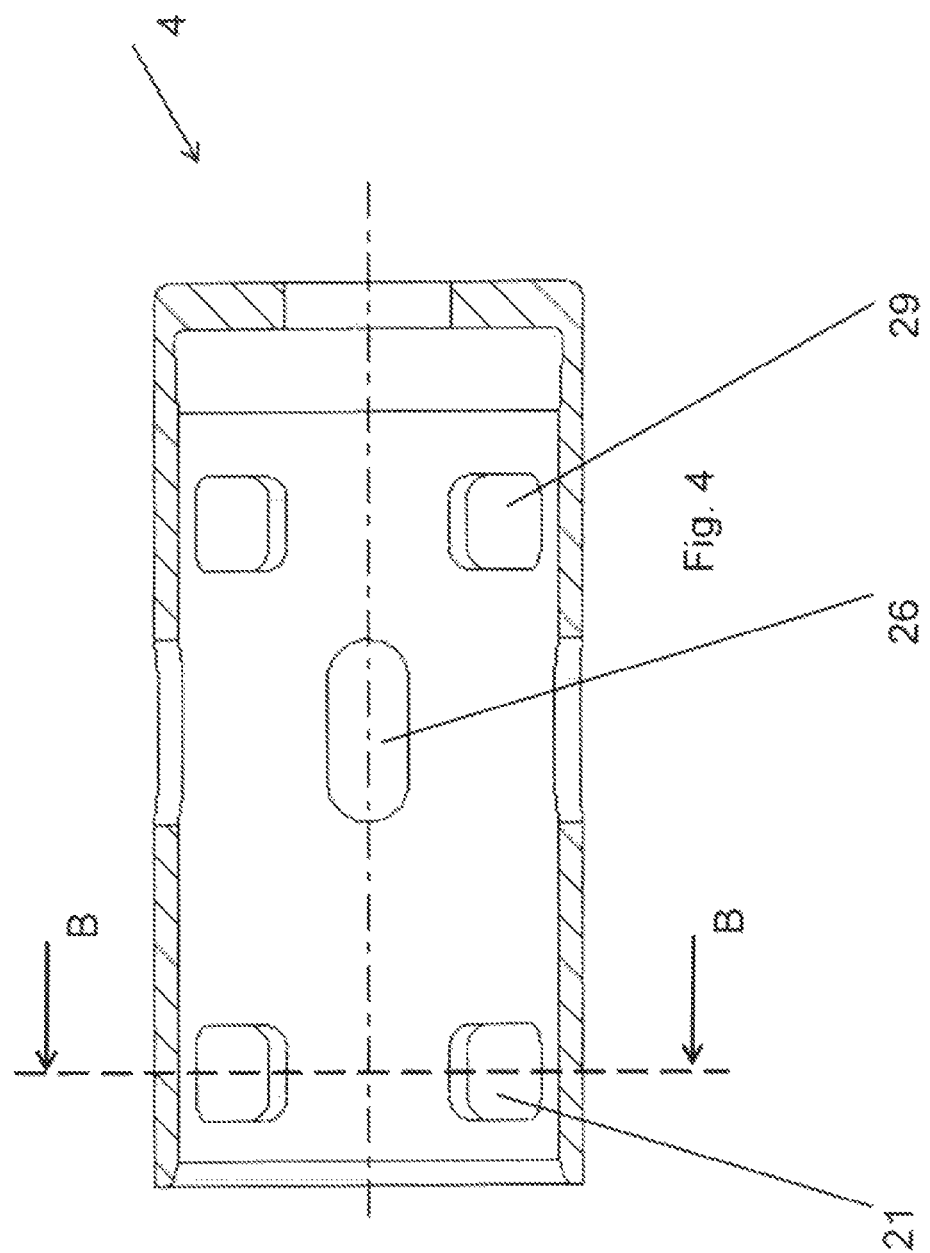

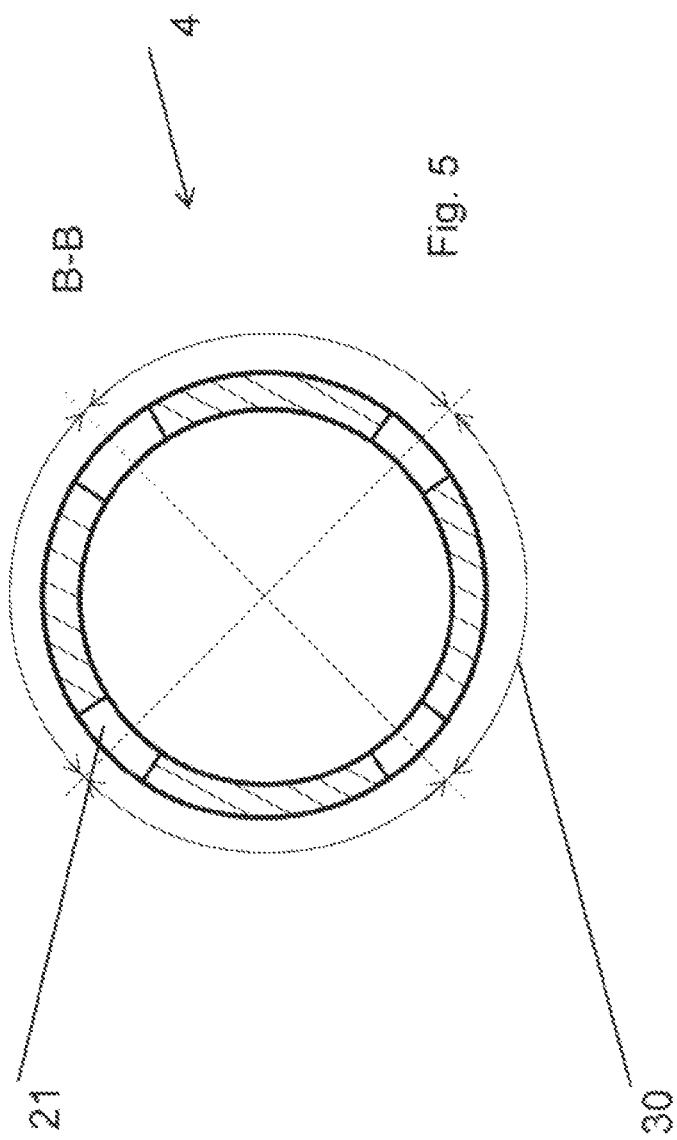

CONTROL VALVE FOR A CAMSHAFT ADJUSTER

The present invention is in the field of control valves, which are used together with camshaft adjusters to regulate the operation of an internal combustion engine. Devices of this type are used to influence the process running during the charge cycle: An adjustment of the phase angle of a camshaft changes the position thereof relative to the phase angle of the crankshaft; the opening and closing times of gas exchange valves may thus be shifted to an earlier or later point in time of the completed cycle. The goal of the regulation is to optimize the operation of the internal combustion engine, taking into account the engine characteristic map, to the effect that consumption and emissions are reduced. The quality of the regulation is dependent on the reliable adjustment of the relative phase angle, thereby imposing strict requirements on the precision of the control valve

BACKGROUND

A control valve is known from DE 10 2008 004 591 A1, which includes a valve housing having at least one inlet port, at least two supply or working ports and at least one outlet port. A hollow and axially movable control piston is guided within the valve housing, with the aid of which the inlet port is connectable to one of the working ports, depending on position, via at least one first pressure medium path, while the other working port is connectable to the outlet port via at least one second pressure medium path. The at least one working port not facing the outlet port may be connected to the outlet port via a third pressure medium path, whose course runs through the interior of the control piston. The working port facing the outlet port may be connected directly to the outlet port, and the pressure medium path runs between the control piston and the control sleeve.

SUMMARY OF THE INVENTION

It is an object of the present invention to provide a control valve which permits a particularly accurate adjustment of the valve piston position.

According to the present invention, the object is achieved by arranging the piston and sleeve openings over the circumference, the angle between the axes of the piston openings differing from the angle between the axes of the sleeve openings, and the same angle range simultaneously covered by the piston and sleeve openings—as a function of the relative position of the control piston to the control sleeve in the circumferential direction—remaining approximately the same.

According to the finding of the present invention, radially arranged openings on the control piston influence the characteristic curve of the provided hydraulic medium, i.e., its volume flow as a function of the switching position of the control valve. Hydraulic medium flows in the axial direction along the outer lateral surface of the control piston, engages with radial openings and induces a flow force.

However, the influence on the characteristic curve has only an indirect effect: The implemented curve depends directly on the axial position of the control piston relative to the control sleeve. On the one hand, a—desired—switching position is effectuated by axially positioning the control piston. On the other hand, however, the characteristic of the control sections is changed—undesirably—by an inaccurate positioning of the control piston. An uneven profile of the characteristic curve is thus directly attributable to the positioning and repetition accuracy of the activation of the different switching positions.

The control piston is generally activated with the aid of an electromagnetically driven actuator. The armature of the electromagnet is shifted in the axial direction as a function of the energizing of the electromagnet, and the armature movement is converted into an axial movement of the control piston via a push rod. The force induced by the electromagnet and transmitted to the push rod, in turn, counteracts the force of a spring. The axial positioning of the control piston is thus dependent on a force equilibrium, which sets in as a result of the release force of the push rod and the oppositely oriented spring force. The stability of the forces relevant for the equilibrium determines the positioning and repetition accuracy.

Radial openings on the piston head influence the force equilibrium. Hydraulic medium flows in the axial direction along the outer lateral surface of the control piston as a function of the switching position. The flow engages with radial openings of the control piston—the piston openings—and applies a flow force to the control piston. The flow force must therefore be taken into account when determining the force equilibrium.

The flow of the hydraulic medium runs along defined channels, which are predefined by the sleeve openings. The flow is therefore not distributed uniformly over the circumference of the control piston. The relative position of the control piston, which sets in randomly with respect to the position of the control sleeve, must therefore be taken into account when determining the force equilibrium; the control piston is not non-rotatably fixed with respect to the position of the control sleeve. The random position of the control piston and the course of the flow thus determine whether the hydraulic medium flow engages or does not engage with a radial opening on the piston head. The flow force engaging with the radial openings on the piston head may thus not be determined in advance and may directly result in an uneven characteristic curve.

The present invention easily reduces the dependency of the characteristic curve, which exists with regard to the relative position of the control piston in the circumferential direction and with regard to the flow course. Being aware of this dependency, those skilled in the art would directly approach the causes of the uneven characteristic curve—first of all, the position of the control piston in the circumferential direction may be defined; alternatively, the cause is eliminated by distributing the flow course of the hydraulic medium evenly over the circumference of the control piston.

The direct path, however, results in approaches which impair the other properties of the control valve: First of all, a fixing of the position of the control piston in the circumferential direction, for example with the aid of a guide, would necessitate additional structural adaptations of existing specific embodiments. Compared to the present invention, the guide of the control piston involves a higher manufacturing complexity, because both the control sleeve and the control piston have to be structurally adapted to the guide. In addition, adapting the components results in additional disadvantages; for example, a guide engages with the profile of a circumferential groove and thus impairs the versatility of the control valve.

An alternative approach could be to distribute the flow course of the hydraulic medium evenly over the circumference of the control piston. The force which acts upon the control piston due to the flow would thus be independent of the relative position thereof in the circumferential direction.

However, this approach is also disadvantageous compared to the present invention. An even distribution would inevitably be structurally associated with a greater axial distance between the openings in the piston head and the openings in the control sleeve. However, the present invention avoids these disadvantages and achieves an approximately uniform characteristic curve and simultaneously a compact design of the control valve.

A further improvement of the characteristic quality is achievable by the fact that the number of radially arranged piston openings and the number of radially arranged sleeve openings do not have a common denominator. The advantage of the specific embodiment is a particularly uniform flow force. No more than one piston opening and one sleeve opening overlap over the entire area of the possible position of the control piston in the circumferential direction—relative to the position of the control sleeve; additional openings overlap only partially.

In one preferred specific embodiment, the number of radially arranged piston openings around an opening must be selected to be greater than or less than the number of radially arranged sleeve openings.

The present invention may be advantageously designed by forming three or five radially arranged piston openings on the piston head and forming four radially arranged sleeve openings on the control sleeve. In this specific embodiment, the idea of the present invention may be effectuated with a minimum processing complexity. The same applies in the case that three or five radially arranged sleeve openings are formed on the control sleeve and four radially arranged piston openings are formed on the piston head.

In another preferred embodiment, the radially arranged piston openings and the radially arranged sleeve openings may be arranged in an axially offset manner. The problem of the engagement of a flow force still exists; however, the characteristic quality may be further improved if, as a result of an axial offset, the flow course is influenced by distributing the flow over larger areas of the outer lateral surface of the control piston. At the same time, a compact design of the control valve may be largely retained.

In one advantageous refinement of the present invention, the control sleeve and a pressure medium guide insert are designed as a single piece. In this case, the pressure medium guide insert and the control sleeve together perform the function of the control sleeve.

The control valve is preferably used in a camshaft adjuster. If the control valve is used in a camshaft adjuster, the radially arranged openings on the piston head and on the control sleeve are outlet openings or inlet openings for a hydraulic medium.

BRIEF DESCRIPTION OF THE DRAWINGS

The present invention is now explained in greater detail on the basis of one exemplary embodiment, reference being made to the drawings. Elements having the same functions are provided with the same reference numerals in the drawings.

FIG. 2: shows a perspective view of a control piston of the control valve from FIG. 1;

FIG. 3: shows a cross section of the control piston from FIG. 2;

FIG. 4: shows a perspective view of a control sleeve of the control valve from FIG. 1; and FIG. 5: shows a cross section of the control sleeve from FIG. 4.

DETAILED DESCRIPTION

Figure 1:
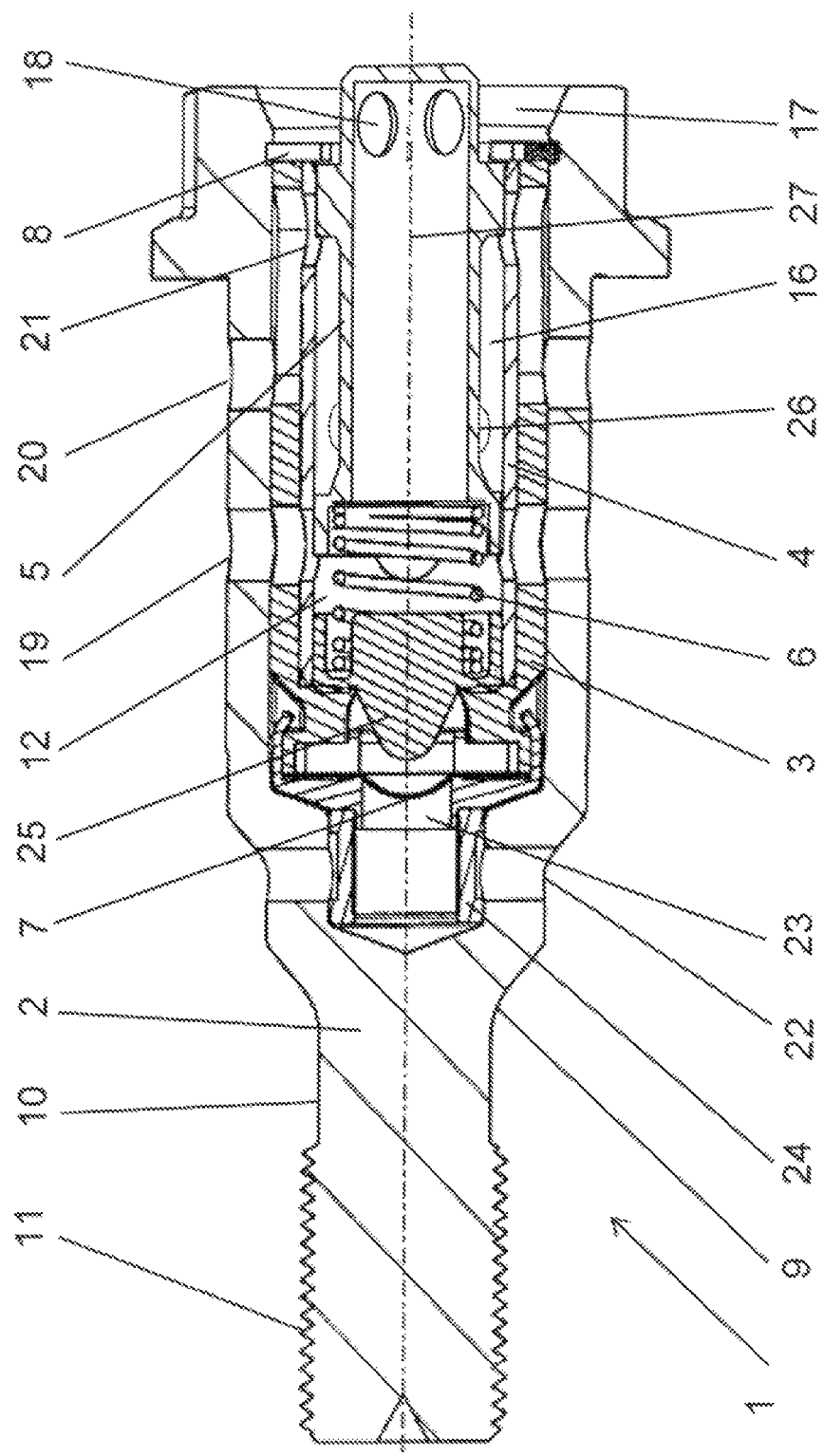
FIG. 1: shows a longitudinal sectional view of a control valve. The drawing illustrates an exemplary embodiment which is particularly suitable for a camshaft adjuster.

An exemplary embodiment of control valve 1, which is particularly suitable for camshaft adjusters, is shown in FIG. 1. Control valve 1 is designed in the form of a central valve, which may be inserted into a central bore of the rotor of a camshaft adjuster having a vane cell design. The principle way in which control valves and camshaft adjusters interact is known to those skilled in the art from DE 10 2005 052481 A1, which also describes the connection to the hydraulic system. Reference is hereby expressly made to the disclosure of the aforementioned publication.

FIG. 1 shows a control valve 1, which includes a valve housing 2, a pressure medium guide insert 3 and a control sleeve 4 as well as a control piston 5. Control valve 1 furthermore includes a spring element 6, a check valve unit 7 and a retaining ring 8.

Valve housing 1 includes a housing body 9, which is expandable in stages and has a housing shaft 10, which is provided with a male thread 11. The unit including pressure medium guide insert 3 and control sleeve 4 is situated in housing cavity 12 and forms an axial guide for control piston 5.

Control piston 5 includes (as shown in FIG. 2) a first section 13 and a second section 14, which encompass a third section 15 having a reduced diameter. Third section 15 forms a control groove 16 together with the inner wall of the control sleeve. Piston head 17a forms a fourth section, which faces housing cavity opening 17 and which has a reduced diameter compared to the diameter of second section 14. Radially arranged piston openings 18 are situated on piston head 17a. Additional radially arranged openings are situated on the valve housing, on the pressure medium guide insert and on the control sleeve, which form a first radial passage 19, a second radial passage 20 and sleeve opening 21. First and second radial passages 19, 20 form the supply or working ports A and B.

Pressure medium may be supplied to control valve 1 over a pressure medium line, which is not illustrated in detail, via a third radial passage 22—the inlet or pressure port P. The pressure medium flow in the direction of housing cavity 12 via a central opening 23 and passes through an annular filter 24 and a check valve unit 7. Check valve unit 7 of the illustrated control valve is designed as a check valve having a sealing disk; an overexpansion of the sealing disk is prevented by a stop 25; however, other specific embodiments of a check valve are also conceivable, e.g., a closing element formed from a ball.

The pressure medium flow enters control groove 16 via a control groove opening 26. The connection to one of supply or working ports A or B takes place by axially positioning control piston 5, which is set against the force of a spring element 7, e.g., with the aid of an electromagnetically driven positioning unit (not illustrated). The pressure medium flows either to supply or working port A or B via control groove 16, as a function of the axial position of control piston 5. The particular working port not connected to the inlet is connected to the outlet, tank port T, and the outflow takes place via housing cavity opening 17. The pressure medium flowing out of working port A enters housing cavity 17 through first radial passage 19 and continues on its way to the outlet or tank port T via piston cavity 27. The outflow takes place via piston openings 18.

The outflow of the pressure medium from working port B follows another path. Due to the axial position of control piston 5, the direct path to housing cavity opening 17 is unblocked. The pressure medium flows into housing cavity 12 through sleeve opening 21, continues on its way along the outer lateral surface of control piston 5 and ultimately reaches outlet or tank port T. During the outflow, the pressure medium flow engages with piston openings 18 and generates a flow force. Due to the angle ranges of approximately the same size (see FIGS. 3, 5), which are simultaneously covered by piston and sleeve openings 18, 21, the dependency of the flow force on the relative position of control piston 5 to control sleeve 4 is reduced in the circumferential direction.

Control piston 5 from FIG. 1 is illustrated in FIG. 2. A first section or a first control edge 13 and a second section or a second control edge 14, which encompass a third section 15 having a reduced diameter, are illustrated. A fourth section, which forms piston head 17a, abuts first section 13. The control piston has three radially arranged piston openings 18 on its piston head 17a. Piston openings 18 may be essentially circular, although they may also be effectuated by another geometric shape.

FIG. 3 shows a cross section of control piston 5 from FIG. 2. An angle, which is referred to as piston angle 28, is plotted between the axes of piston openings 18. In the illustrated specific embodiment, piston angles 28 between the axes of piston openings 18 have the same size between all axes, and piston openings 18 are thus evenly distributed over the circumference of piston head 17a.

However, an uneven distribution of piston openings 18 over the circumference of piston head 17a is also conceivable. In this case, the angles between the axes of piston openings 18 must differ, both alone and in their stepwise added-up total, from the angles between the axes of sleeve openings 21, both alone and in their stepwise added-up total, with the exception of the full angle.

Control sleeve 4 from FIG. 1 is illustrated in FIG. 4. A first pressure medium passage 29, a second pressure medium passage or four sleeve openings 21 and control groove opening 26 are formed on control sleeve 4. Four sleeve openings 21 are evenly distributed over the circumference and may be designed as slots, which extend in the axial direction; however, any other geometric shape may also be used for the outlet of a hydraulic medium.

With the aid of a cross section of control sleeve 4, FIG. 5 shows the angle between the axes of the sleeve openings, which is referred to here as sleeve angle 30. Sleeve openings 21 are distributed evenly over the circumference. However, an uneven distribution may also be considered; in this case as well, the angles between the axes of piston openings 18 must differ, both alone and in their stepwise added-up total, from the angles between the axes of sleeve openings 21, both alone and in their stepwise added-up total, with the exception of the full angle.

LIST OF REFERENCE NUMERALS

1 control valve
2 valve housing
3 pressure medium guide insert
4 control sleeve
5 control piston
6 spring element
7 check valve
8 retaining ring
9 housing body
10 housing shaft
11 male thread
12 housing cavity
13 first section or first control edge
14 second section or second control edge
15 third section
16 control groove
17 housing cavity opening
17a fourth section or piston head
18 piston opening
19 first radial passage
20 second radial passage
21 sleeve opening or second pressure medium passage
22 third radial passage
23 central opening
24 annular filter
25 stop
26 control groove opening
27 piston cavity
28 piston angle
29 first pressure medium passage
30 sleeve angle

What is claimed is:

1. A control valve comprising:
   a hollow cylindrical control piston having a piston head and radially arranged piston openings on the piston head, the piston head being reduced in diameter compared to an adjacent section;
   a control sleeve acting as an axial guide for the control piston and having radially arranged sleeve openings on an end section facing the piston head; and
   two pressure medium paths suitable for guiding a pressure medium flow, one of the pressure medium paths leading through the sleeve opening and at least partially in an axial direction along one section of a outer lateral surface of the piston head,
   the piston and sleeve openings are distributed over a circumference, an angle between axes of the piston openings differing from an angle between the axes of the sleeve openings, and a same angle range simultaneously covered by the piston and sleeve openings—as a function of the relative position of the control piston to the control sleeve in a circumferential direction—remaining approximately the same.

2. The control valve as recited in claim 1 wherein the piston or sleeve openings are distributed unevenly over the circumference, the angles between the axes of piston openings differing, both alone and in a stepwise added-up total, from the angles between the axes of the sleeve openings, both alone and in a stepwise added-up total, with the exception of a full angle.

3. The control valve as recited in claim 1 wherein a number of radially arranged piston openings and a number of radially arranged sleeve openings do not have a common denominator.

4. The control valve as recited in claim 1 wherein a number of radially arranged piston openings around an opening is greater than or less than the number of radially arranged sleeve openings.

5. The control valve as recited in claim 1 wherein three or five radially arranged piston openings are formed on the piston head, and four radially arranged sleeve openings are formed on the control sleeve.

6. The control valve as recited in claim 1 wherein three or five radially arranged sleeve openings are formed on the control sleeve, and four radially arranged piston openings are formed on the piston head.

7. The control valve as recited in claim 1 wherein the radially arranged piston openings and the radially arranged sleeve openings are arranged in an axially offset manner.

8. The control valve as recited in claim 1 wherein the control sleeve and a pressure medium guide insert are designed as a single piece.

9. The control valve as recited in claim 1 wherein the radially arranged openings on the piston head and on the control sleeve are outlet openings or inlet openings for a hydraulic medium.

10. The control valve as recited in claim 1 wherein the control valve is used to control a camshaft adjuster.

\* \* \* \* \*